United States Patent
De Meneses Moutinho E Henriques Gonçalo et al.

(10) Patent No.: US 10,704,503 B2
(45) Date of Patent: Jul. 7, 2020

(54) METHOD TO INCREASE THE EFFICIENCY OF COMBUSTION ENGINES

(71) Applicant: ULTIMATE CELL, LDA., Sintra (PT)

(72) Inventors: Paulo Eduardo De Meneses Moutinho E Henriques Gonçalo, Agualva-cacém (PT); Francisco Diogo Quintão Duarte Silva, Agualva-cacém (PT); Christopher Adair, Killarney (IE)

(73) Assignee: ULTIMATE CELL, LDA, Sintra (PT)

( * ) Notice: Subject to any disclaimer, the term of this patent is extended or adjusted under 35 U.S.C. 154(b) by 0 days.

(21) Appl. No.: 15/520,434

(22) PCT Filed: Aug. 31, 2015

(86) PCT No.: PCT/PT2015/000043
§ 371 (c)(1),
(2) Date: Apr. 20, 2017

(87) PCT Pub. No.: WO2016/064289
PCT Pub. Date: Apr. 28, 2016

(65) Prior Publication Data
US 2018/0058387 A1 Mar. 1, 2018

(30) Foreign Application Priority Data
Oct. 20, 2014 (PT) .......................... 107973

(51) Int. Cl.
*F02B 43/08* (2006.01)
*F02M 25/12* (2006.01)
(52) U.S. Cl.
CPC ............ *F02M 25/12* (2013.01); *Y02E 60/366* (2013.01); *Y02T 10/121* (2013.01)
(58) Field of Classification Search
USPC .......................................................... 123/3
See application file for complete search history.

(56) References Cited

U.S. PATENT DOCUMENTS

2013/0061822 A1* 3/2013 Adair ............... F02B 43/10
123/3
2014/0090986 A1* 4/2014 Bethurem ............... C25B 1/08
205/462
(Continued)

FOREIGN PATENT DOCUMENTS

AU 2009 100 335 5/2009
DE 20 2008 012040 U 11/2008
(Continued)

OTHER PUBLICATIONS

A. M. Falahat et al: "Engine performance powered by a mixture of hydrogen and oxygen fuel obtained from water electrolysis",;International Journal of Automotive Technology, vol. 15, No. I, Feb. 1, 2014 (Feb. 1, 2014), pp. 97-101, XP055235542, Heidelberg ISSN: 1229-9138, DOI: 10.1007/s12239-014-0011-0 figures 1-7.

(Continued)

*Primary Examiner* — Hung Q Nguyen
*Assistant Examiner* — Anthony Donald Taylor, Jr.
(74) *Attorney, Agent, or Firm* — Mark M. Friedman

(57) ABSTRACT

The present invention is related to an optimization method to internal combustion engines that reduces the fuel consumption and the exhaust emissions and particulated material. The operation principle is based in the introduction of small quantities of hydrogen in the air intake duct of the engine with the objective of optimizing the combustion of the traditional fuels, improving the parameters of the combustion reaction. This optimized combustion will increase the efficiency of the engine and reduce its environmental impact. The hydrogen is produced by an electrolysis reaction inside an electrochemical closed cell with non-circulating electrolyte.

4 Claims, 2 Drawing Sheets

(56) References Cited

U.S. PATENT DOCUMENTS

| | | | | |
|---|---|---|---|---|
| 2014/0367272 | A1* | 12/2014 | Haywood | C25B 15/08 |
| | | | | 205/341 |
| 2015/0191834 | A1* | 7/2015 | Patru | C25B 11/0489 |
| | | | | 205/630 |
| 2015/0226113 | A1* | 8/2015 | Alexander | F02D 41/0027 |
| | | | | 123/3 |
| 2016/0333487 | A1* | 11/2016 | Delgado Rodriguez | |
| | | | | C25B 1/06 |

FOREIGN PATENT DOCUMENTS

| | | |
|---|---|---|
| EP | 2 476 781 | 7/2012 |
| WO | 2014/110295 | 7/2014 |

OTHER PUBLICATIONS

Tephen Samuel et al: "Hydrogen Enriched Diesel Combustion", SAE Technical Paper Series, vol. I, Oct. 25, 2010 (Oct. 25, 2010), XP055235536, ISSN: 0148-7191, DOI: 10.4271/2010-01-2190.

* cited by examiner

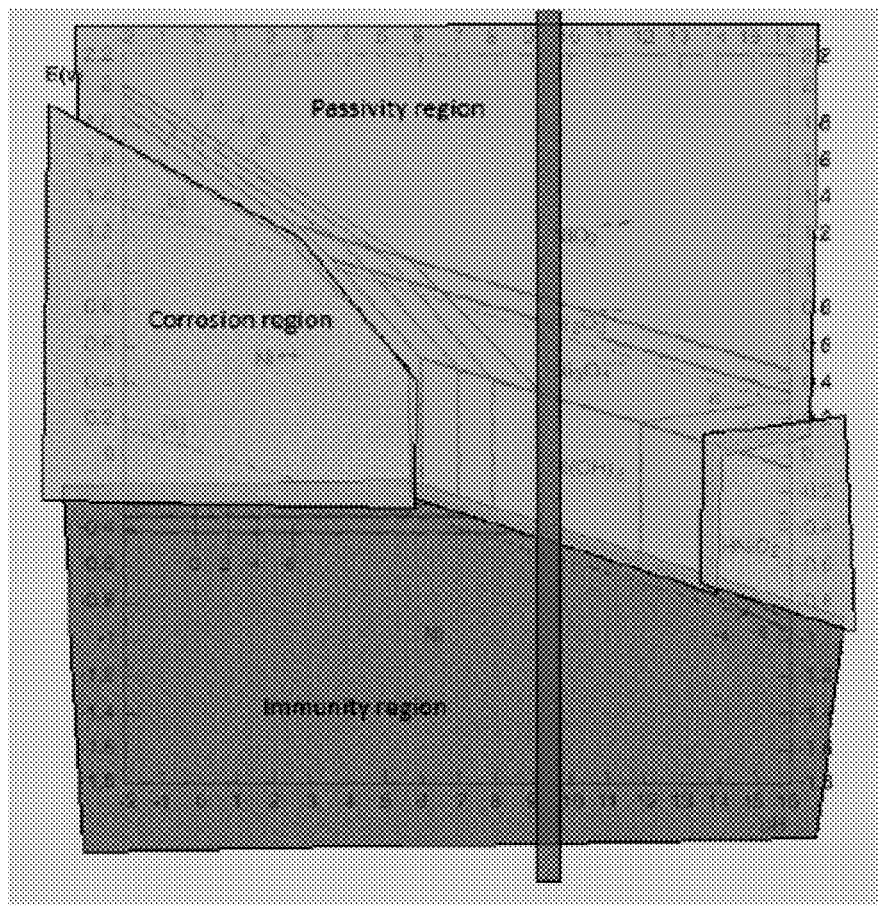
Figure 1 – Pourbaix Diagram
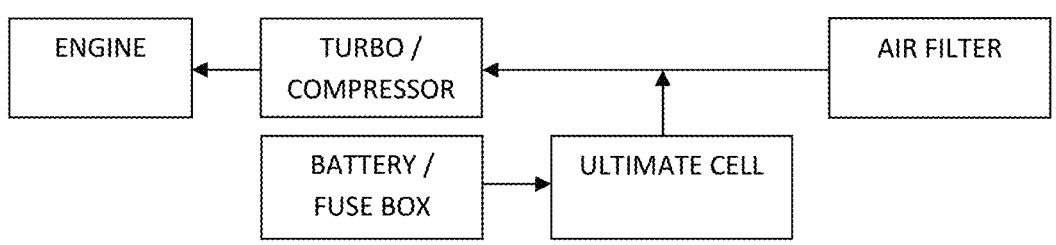
Figure 2 – Installation scheme

METHOD TO INCREASE THE EFFICIENCY OF COMBUSTION ENGINES

INTRODUCTION

Hydrogen, besides being the chemical element more abundant in the Universe, making approximately 75% of its mass, is in its elementary form relatively rare in the Planet Earth. Industrially it is produced from hydrocarbons present in the natural gas, like methane, being normally used locally given the difficulties to transport if safely without letting it recombine with the other elements. The biggest markets in the World use hydrogen to refine fossil fuels in hydrocracking processes that consist in the fragmentation of the long hydrocarbon molecular chains into smaller chains more reactive to combustion. Hydrogen can also be obtained by means of water electrolysis, being a process normally expensive and demanding on material and energetic levels.

Hydrogen has been lately used in internal combustion engines as a main fuel, or as a partial replacement for the hydro carbonic fuels (petrol and diesel), being added to the air/fuel mixture. Hydrogen by its reactivity and chemical affinity has a high risk of explosion when pressurized, being its storage and transportation an operation submitted to the strictest security measures. As an alternative to the storage and transportation, other solutions started to be studied, like methods of transforming and producing hydrogen directly in the location of usage, being the process of water electrolysis one of the more usual. Starting from the water molecule ($H_2O$), after electrolysis are obtained two molecules of hydrogen and one molecule of oxygen, under a gaseous form normally known as HHO.

This process has been studied and optimized during time being, even with the latest systems, a reaction with high energy demand and low efficiency, with several difficulties of electrochemical balance that frequently cause the corrosion of the electrodes, material degradation and frequent maintenance to assure the operation of the systems.

Many of these fuel replacement systems use weight percentages of substitution around 5%. Ratios of this value, to a light vehicle normal engine with 1.6 litres of displacement, need hydrogen flows of around 3 litres per minute. To produce such a flow of hydrogen by means of electrolysis high electrical current is needed, exceeding the 30 Amps, too much for the vehicle's electrical system.

Even assuming the efficiency increase and fuel consumption reduction by the introduction of hydrogen as a fuel, its high electrical consumption makes the system energetically unfeasible. These systems consume electrical energy that they convert into chemical energy (HHO) that is burned afterwards being transformed into mechanical energy (internal combustion engine), that is than transformed back into electrical energy (alternator) that will feed the electrochemical cell where the electrolysis takes place. This last transforming element (alternator) will naturally have an increase on mechanical energy consumption to assure the production of the extra electrical consumption needed for the electrolysis process.

All these energy transformation processes have efficiencies naturally bellow 100%, making all this global process thermodynamically inefficient, making no sense using hydrogen as a fuel when being locally produced by electrolysis powered by the same system that is consuming it.

Also, the water electrolysis doesn't produces only hydrogen, being oxygen other element produced in the reaction. The oxygen will be fed along with the hydrogen into the air intake of the engine interfering also in the combustion. The increase of oxygen in the intake air will make the mixture leaner, making it detectable by the engine management sensors (lambda sensor) that will try to correct the mixture adding more fuel. This correction is not welcome and goes against the initial objective of reducing the fuel consumption. That's why these systems frequently use sensor correction systems (on the lambda sensor) with the purpose of "cheating" the signals making the ECU read and consider a concentration of oxygen lower than real.

All these difficulties made these still rudimental systems of using hydrogen as a fuel in combustion engines, a failure, with doubtable and inconsistent results of real engine efficiency increase.

Even with the risk of storing and transporting hydrogen, the car manufacturers started using the gas as an energetic source to produce electrical energy that is afterwards used to power one or more electric engines for vehicle propulsion. Such evolution completely revolutionizes the automotive sector, until now based on internal combustion propulsion systems. Practically it's an inverted electrolysis system where hydrogen and oxygen are fed to an electrochemical cell, converting both elements into water ($H+H+O->H_2O$), producing electrical energy on the recombination process that is afterwards used by the electrical engine. The globalization of this concept presupposes the replacement of millions of vehicles with internal combustion engines, transferring to the industry the responsibility and energetic costs of producing, storing and supplying hydrogen.

SUMMARY OF THE INVENTION

Based on the actual state of art of the hydrogen usage in optimization processes of internal combustion engines, it was tested and proven a new form of using this small but powerful molecule. The invention refers to a method of increasing the efficiency of internal combustion engines, using hydrogen to act not as a fuel but as a combustion parameters optimizer under the form of an oxidizer fed to the engine along with the intake air.

Significant results were obtained on the chemical efficiency increase and consequently energetic efficiency of internal combustion engines.

In fact using a reduced weight proportion of hydrogen with the fuel used, the traditional hydro carbonic fuels combustion efficiency can be optimized. Such hydrogen addition allows making the burning more complete with less harmful exhaust emissions, producing more mechanical energy from the same quantity of fuel. The necessary quantity of hydrogen to optimize this reaction is minimal, making its production by electrolysis a valid possibility with reduced electrical consumptions and chemically stable.

Hydrogen has unique parameters and an extremely high reactivity. Its addition to the combustion reaction accelerates de front of flame speed that in an internal combustion engine greatly determines the efficacy of the combustion on the transfer from chemical to mechanical energy. The hydrogen inside the combustion chamber will react with the fuel combining itself with the carbon molecules, breaking the fuel's molecular chains. This reaction is triggered by the typical explosion of combustion engine, taking place instants before the normal fuel combustion that occurs already with pre-cracked fuel chains by action of hydrogen. This pre-cracked fuel has a fastest and easier combustion, allowing a bigger and more complete energetic deliverance that will be reflected in a overall efficiency increase of the combustion process. The engine will be able to deliver more work with the same quantity of fuel. At the same time a more complete combustion by the effect of hydrogen as a catalyzer, will produce less unburned hydrocarbons that are responsible contamination of the combustion chambers and subsequently the all engine including the lubrication oil. The catalytic action of hydrogen in a combustion engine will in this form contribute for its cleanness, avoiding the combustion residues build up. The reduction of these residues that come from an incomplete combustion, have a direct impact in the pollutant exhaust emissions reduction.

The process was studied and optimized with the objective of minimizing the corrosion of electrodes and the overall material degradation, with long electrolyte duration and long maintenance intervals. Using the latest technology in the electronic management of the reaction allowed the reduction of the electrical consumption, allowing having an energetically valid concept efficient in the optimization of internal combustion engines. This invention comes as a sustainable and environmental solution for internal combustion engines used globally for the most varied proposes. Without changing their operation method the combustion engines can have their environmental impact reduced at the same time they reduce the fuel consumption while performing the same work.

The method and device object of this invention comes to revolutionize the way of obtaining and applying hydrogen in the combustion process. It's a device for optimizing internal combustion engines that reduces the fuel consumption and the exhaust emissions. The device works has a hydrogen generator by electronically managed electrolysis process using non circulating electrolyte. With an optimized electrical energy consumption the device only produces the necessary quantity of hydrogen to optimize the efficiency of the combustion engine. The hydrogen, fed directly into the air intake, will work as a combustion parameters optimizer inside the engine, allowing a faster and more complete combustion of the tradition fuel. With this optimized operation of the engine, the fuel consumption can achieve reductions of 30% and the pollutant exhaust emissions be reduced in up to 80%. The system can be applied into any internal combustion engines without major modifications, with reduced installation and maintenance costs, allowing extremely attractive ROIs.

The installation of the device object of this invention was approved by the Portuguese Governmental Transportations Regulator, IMT in November 2013, after several tests that proof the results of the technology, its safety and liability. The tests were performed in well internationally recognized institutes such as Instituto Superior Técnico (IST) and Instituto de Soldadura e Qualidade (ISQ). The product respects the European Community normatives, Directive 2006/42/EC and Directive 2011/65/EU.

The device object of this invention is actually certified by the Vehicle Certification Authority (VCA) that granted the product an E-mark (E11-10R-058662), assuring its world approval to install safely in automotive vehicles.

This product is in line with the European Union objectives for 2020, regarding the climatic changes and energetic sustainability.

STATE OF THE ART OF THE INVENTION

The documents found after research to the state of the art, being considered the closest prior art:
(D1) US2010206721 A1;
(D2) US2003024489 A1;
(D3) CN203307438 U.

The distinction between the state of the art and the present invention is related to the quantity of the hydrogen used. The weight proportion used in the present invention is clearly lower than the used in the state of the art reference documents, since we are referring to a different optimization process than the normal HHO burn along with fuel.

DETAILED DESCRIPTION OF THE INVENTION

The method object of the invention is intended to optimize internal combustion engines, reducing the fuel consumption and the exhaust emissions and particulated materials. It uses a specific device to produce hydrogen.

The present invention is based in the introduction of small quantities of hydrogen in the air intake manifold of the engine with the objective of optimizing the burn of the traditional fuels, improving the combustion reaction parameters.

This optimized combustion will increase the efficiency of the engine and reduce its environmental impact. The hydrogen is produced by an electrolysis reaction inside an electrochemical cell with non-circulating electrolyte.

The referred method uses a hydrogen production device powered from the engine's electrical circuit that can be connected to the battery or fuse box. The device is controlled electronically by an integrated module that manages the electrolysis reaction, assuring that the device only operates when the engine is running and that the production of hydrogen is adequate to the quantity of fuel consumed by the engine, that maybe inferred by the displacement and rotation speed of the engine.

When the device turns on, is started inside it an electrolysis process electronically managed, resulting in the chemical separation of the hydrogen and oxygen molecules from the electrolyte contained in the device, that will be introduced in the intake air of the engine.

The produced hydrogen will then mix with the air and fuel in the combustion chambers of the engine, changing the parameters of the reaction, allowing a faster and complete combustion of the traditional fuel with a more even temperature over the pistons' surface.

The result is an engine with improved performance and efficiency, which will lead to a smoother and quieter running with a low rev torque increase. This optimized engine operation more often reduces the fuel consumption and reduces the exhaust emissions gases and particulate material, reducing the operation costs and protecting our environment. The electrolyte fluid inside the ULTIMATE CELL is consumed during normal operation and it should be periodically recharged depending on the operation time and engine's displacement. The device warns the user when an electrolyte recharge is needed.

This device of hydrogen production by electrolysis consists in a hermetically closed container that operates as an electrochemical cell with non-circulating electrolyte. It needs only to be opened to refill new electrolyte that is consumed during operation. On the bottom of the container are placed a minimum of two electrodes made of nickel, with purity above 99%. The distance between the electrodes and its surface area are defined according the geometry and production rate of the device, in order to assure the right voltage that doesn't empower the corrosion. According the Pourboix diagram (FIG. 1) for nickel, it's needed to assure a relation between pH and voltage that keeps the electrolysis reaction inside the passivity zone. The electrolyte used is a water based solution with potassium hydroxide with a concentration that assures a voltage between the electrodes of 2 volts. As a possible configuration that assures all these parameters in its simplest form, we have 2 electrodes of nickel (Ni201) with 12.4 cm$^2$ distanced from each other 5 mm with the electrolyte with a concentration of 0.5 Mol (2.5%).

The electrolysis process is controlled by an electronic circuit (PCB) that assures the correct flow of hydrogen for the fuel consumed by the engine to optimize, regulating the electrical current that goes though the electrochemical cell. The PCB is also responsible to assure that the device will only turn on when the engine is running, detecting the voltage increment that is a result of the alternator operation. This voltage threshold is adjustable in the PCB to allow it to adapt to any engine's electrical system. In order to optimize the electrical energy consumption and make it possible to power with a voltage between 3 and 30 volts DC, the PCB incorporates a switching power source that commutates the input voltage with the necessary frequency that gives on the output the necessary equivalent voltage, smoothed by a condenser that minimizes the ripple effect (alternate current component that exceeds the average voltage of a continuous current). When the device initiates the production of hydrogen, it's indicated on the front panel of the device that it's operating. When is necessary to refill the container with electrolyte, it is indicated also on the front panel that a recharge is needed. On the top, the cell is sealed with a condensation membrane that avoids leakages and minimizes the evaporation of the electrolyte, letting pass though only the gas produced by electrolysis. The membrane can be made with many materials and forms that assure its functionality resisting chemically to the electrolyte formulation, being the perforated EPDM film with 1 mm of thickness one of the chosen configurations.

When turned on, the device initiates an electrolysis process with the separation of the water on molecules of hydrogen and oxygen that will pass by the condensation membrane, exiting trough the outlet pipe in the top of the device. The flow of the HHO gas produced is regulated by the PCB according to the fuel consumption of the engine to assure a weight percentage of HHO relatively to fuel between 0.0005% and 0.05%, or preferably between 0.002% and 0.01%, having as reference value of the control equation followed by the electronic module of the device the weight relation of 0.005% for diesel engines and 0.002% for gasoline engines. This proportion, in stoichiometric combustion is equivalent to a volumetric ratio between air and HHO between 1:2.5×10$^{-6}$ and 1:3.5×10$^{-6}$. This extremely low ratio makes that the HHO gas that is added to the oxidizer (air) doesn't interfere on the engine management sensors like the Air Mass Sensor (MAF) in the air intake or oxygen sensor in the exhaust (Lambda).

To assure this proportion it was considered as density of the produced HHO equal to 0.5363 g/l, being considered ideal for optimization of combustion a weight relation between HHO and fuel between 0.0005% and 0.05%, or preferably between 0.002% and 0.01%. This equation with the corrected weight adjustments comes to be applicable to all types of hydro carbonic fuels used in internal combustion engines: Gasoline (0.75 kg/l); Diesel (0.85 kg/l); LPG (2.5 g/l).

The gas produced is injected into the air intake duct of the engine. There isn't in the device, at any time, pressurized storage of hydrogen, being all the produced flow of gas consumed directly by the internal combustion engine. The existent vacuum in the air intake will depressurize the device assuring the extraction of the gas produced inside the unit.

The device should be installed near the engine, away from heat sources or moving parts. The device is electrically powered from the engine's electrical system (12 or 24 volts), directly from the battery or fuse box, being its circuit protected by a fuse adequate to the maximum consumption of the device. The hydrogen feeding tube that comes of the top of the device will be connected to the air intake duct of the engine in a section after the air filter and before any volumetric compressor that may exist.

BRIEF DESCRIPTION OF THE FIGURES

FIG. 1—Pourboix diagram where is presented the graphical representation of the possible equilibrium stable stages of a electrochemical system.

FIG. 2—Shows an arrangement of the entire system.

Figure 3:
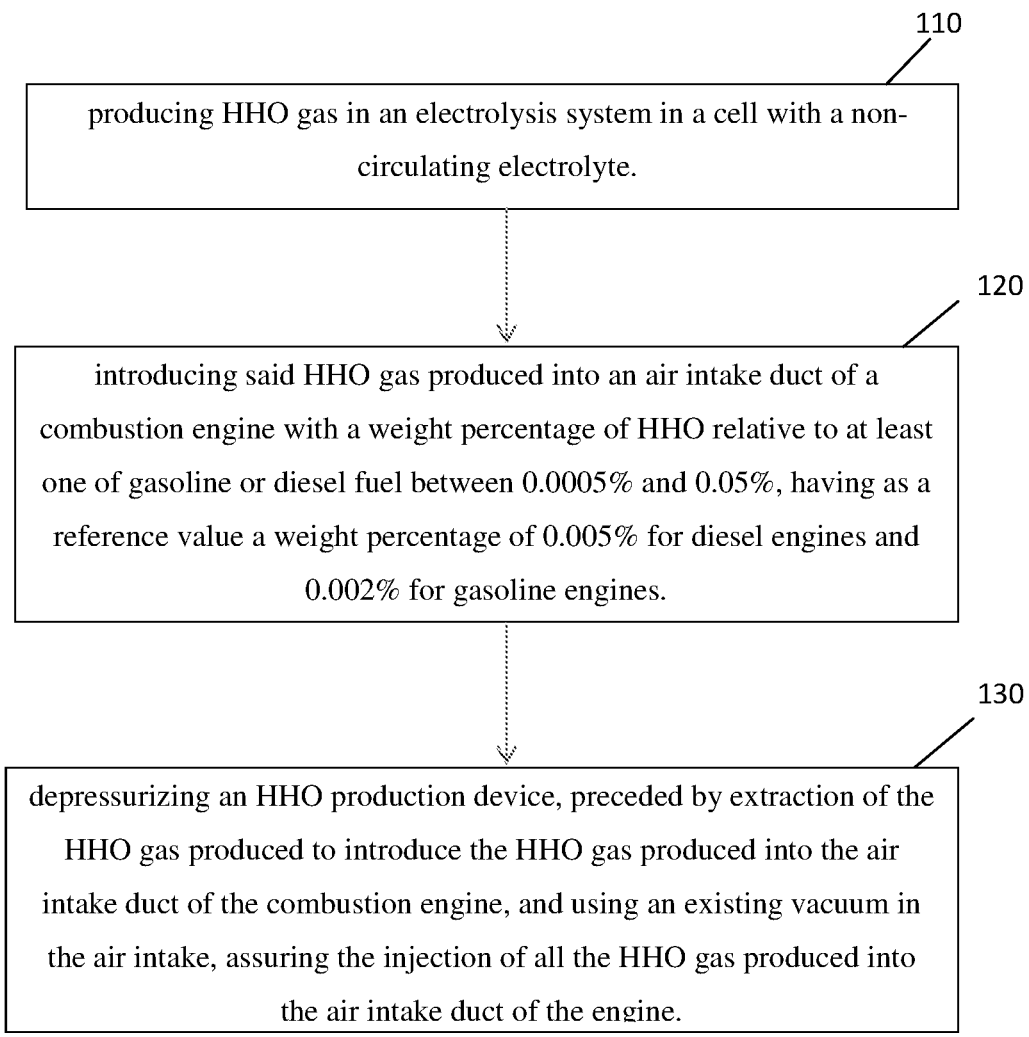

The invention claimed is:

1. A method to increase efficiency of combustion engines, the method comprising:
    a) producing HHO gas in an electrolysis system using a cell with a non-circulating electrolyte and electrodes made from nickel with a purity greater than 99%;
    b) introducing the HHO gas produced into an air intake duct of a combustion engine in accordance with a weight percentage of HHO gas relative to at least one of gasoline or diesel fuel, of 0.005% for diesel engines and 0.002% for gasoline engines, such that a quantity of the HHO gas introduced depends on a quantity of fuel used in the combustion engine; and
    c) depressurizing an HHO production device, preceded by extraction of the HHO gas produced to introduce the HHO gas produced into the air intake duct of the combustion engine, and using an existing vacuum in the air intake duct, thereby assuring an injection of all of the HHO gas produced into the air intake duct of the combustion engine, wherein the introduction of the HHO gas is adjustable by an electronic control unit to maintain a volumetric ratio between air and hydrogen between 1:2.5×10$^{-6}$ and 1:3.5×10$^{-6}$, assuming a stoichiometric combustion.

2. The A method according to claim 1, wherein a the density of the HHO gas produced is 0.5363 g/l.

3. The A method according to claim 1, further comprising feeding hydrogen through a hydrogen feeding tube from an exit at a top of the electrolysis system, the hydrogen feeding tube being connected to the air intake duct in a section downstream from an air filter and upstream of an air compressor.

4. A method according to claim 1, wherein a voltage at the electrodes is regulated electronically.

* * * * *